United States Patent
Koseoglu

(10) Patent No.: US 11,389,790 B2
(45) Date of Patent: Jul. 19, 2022

(54) METHOD TO RECOVER SPENT HYDROPROCESSING CATALYST ACTIVITY

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 227 days.

(21) Appl. No.: 16/889,121

(22) Filed: Jun. 1, 2020

(65) Prior Publication Data

US 2021/0370283 A1    Dec. 2, 2021

(51) Int. Cl.
*B01J 38/02* (2006.01)
*B01J 38/12* (2006.01)
*B01J 38/62* (2006.01)

(52) U.S. Cl.
CPC ............ *B01J 38/02* (2013.01); *B01J 38/12* (2013.01); *B01J 38/62* (2013.01)

(58) Field of Classification Search
CPC ... B01J 23/94; B01J 38/00; B01J 38/02; B01J 38/12; B01J 38/20; B01J 38/56; B01J 38/60
See application file for complete search history.

(56) References Cited

U.S. PATENT DOCUMENTS

| | | |
|---|---|---|
| 4,089,806 A | 5/1978 | Farrell et al. |
| 4,122,000 A | 10/1978 | Farrell et al. |
| 4,454,240 A | 6/1984 | Ganguli |
| 4,557,821 A | 12/1985 | Lopez et al. |
| 4,595,666 A | 6/1986 | Ganguli |
| 4,710,486 A | 12/1987 | Lopez et al. |
| 4,714,537 A | 12/1987 | Jorgensen et al. |
| 4,719,006 A | 1/1988 | Goyal |
| 4,720,473 A | 1/1988 | Welch et al. |
| 4,769,219 A | 9/1988 | Tasker et al. |
| 4,837,397 A | 1/1989 | Absil et al. |
| 4,824,526 A | 4/1989 | Goyal |
| 4,824,821 A | 4/1989 | Lopez et al. |
| 4,857,496 A | 8/1989 | Lopez et al. |
| 4,863,884 A | 9/1989 | Tasker et al. |
| 4,970,190 A | 11/1990 | Lopez et al. |
| 4,994,423 A | 2/1991 | Clark et al. |
| 5,071,538 A | 12/1991 | Clark et al. |
| 5,082,552 A | 1/1992 | Welch et al. |
| 5,154,819 A | 10/1992 | Clark et al. |
| 5,162,282 A | 11/1992 | Lopez et al. |
| 5,230,791 A | 7/1993 | Sherwood, Jr. |
| 5,232,885 A | 8/1993 | Clark et al. |
| 5,254,513 A | 10/1993 | Sherwood, Jr. et al. |
| 5,275,990 A | 1/1994 | Clark et al. |
| 5,294,329 A | 3/1994 | Kramer |
| 5,298,152 A | 3/1994 | Kramer |
| 5,445,728 A | 8/1995 | Sherwood, Jr. et al. |
| 5,472,928 A | 12/1995 | Scheuerman et al. |
| 5,492,617 A | 2/1996 | Trimble et al. |
| 5,498,327 A | 3/1996 | Stangeland et al. |
| 5,589,057 A | 12/1996 | Trimble et al. |
| 5,599,440 A | 2/1997 | Stangeland et al. |
| 5,648,051 A | 7/1997 | Trimble et al. |
| 5,660,715 A | 8/1997 | Trimble et al. |
| 5,733,440 A | 3/1998 | Stangeland et al. |
| 5,906,953 A | 5/1999 | Duddy et al. |
| 5,916,529 A | 6/1999 | Scheuerman |
| 5,925,238 A | 7/1999 | Duddy et al. |
| 6,086,749 A | 7/2000 | Kramer et al. |
| 6,869,978 B2 | 3/2005 | Wright et al. |
| 6,962,947 B2 | 11/2005 | Wright et al. |
| 7,431,824 B2 | 10/2008 | Chen et al. |
| 7,906,447 B2 | 3/2011 | McCarthy et al. |
| 7,972,499 B2 | 7/2011 | Chen et al. |
| 8,007,662 B2 | 8/2011 | Lomas et al. |
| 8,128,811 B2 | 3/2012 | McCarthy et al. |
| 8,282,897 B2 | 10/2012 | Marafi |
| 8,497,310 B2 | 7/2013 | Hoek et al. |
| 8,926,824 B2 | 1/2015 | Morel |
| 9,243,194 B2 | 1/2016 | Morel et al. |
| 9,657,239 B2 | 5/2017 | Beech, Jr. et al. |
| 10,000,703 B2 | 6/2018 | Sorensen et al. |
| 2018/0178209 A1 | 6/2018 | Park |
| 2018/0318822 A1 | 11/2018 | Bai et al. |

OTHER PUBLICATIONS

International Search Report and Written Opinion dated Feb. 15, 2021 pertaining to International application No. PCT/US2020/054337 filed Oct. 6, 2020, 12 pgs.

*Primary Examiner* — Brian A McCaig
(74) *Attorney, Agent, or Firm* — Dinsmore & Shohl LLP

(57) ABSTRACT

In accordance with one or more embodiments of the present disclosure, a method for regenerating and rejuvenating a spent catalyst comprising coke and contaminant metals includes washing the spent catalyst with a solvent; drying, at least partially, the spent catalyst; partially combusting the spent catalyst to remove a portion of the coke, thereby producing a partially de-coked catalyst; acid washing the partially de-coked catalyst; and fully combusting the partially de-coked catalyst, thereby producing a regenerated and rejuvenated catalyst. The portion of the coke removed during the partial combustion is greater than or equal to 10 wt. % and less than or equal to 60 wt. %. No rare earth elements are added to the partially de-coked catalyst prior to the fully combusting the partially de-coked catalyst.

20 Claims, No Drawings

METHOD TO RECOVER SPENT HYDROPROCESSING CATALYST ACTIVITY

BACKGROUND

Field

Embodiments of the present disclosure generally relate to catalyst regeneration and rejuvenation, and pertains particularly to a catalyst regeneration and rejuvenation process for removal of coke deposits from spent catalysts using a chemical and combustion treatment.

Technical Background

Crude oil is conventionally processed by distillation followed by various cracking, solvent treatment, and hydroconversion processes to produce a desired slate of fuels, lubricating oil products, chemicals, chemical feedstocks, and the like. An example of a conventional refinery process includes distillation of crude oil in an atmospheric distillation to recover gas oil, naphtha, gaseous products, and an atmospheric residuum. Streams recovered from crude distillation at the boiling point of fuels have customarily been used directly as fuels. Generally, the atmospheric residuum is further fractionated in a vacuum distillation unit to produce a vacuum gas oil and a vacuum residuum. The vacuum gas oil is commonly cracked to provide more valuable light transportation fuel products in a fluid catalytic cracking unit or by hydrocracking. The vacuum residuum can be further treated for conversion to more valuable products. For example, vacuum residuum upgrading processes can include one or more of residuum hydrotreating, residuum fluid catalytic cracking, coking, gasification, and solvent deasphalting.

One major technical challenge posed when catalytically hydrotreating heavy oil fractions or whole crude oil is the effect of small concentrations of contaminants, such as, for example, organic nickel and organic vanadium compounds and poly-nuclear aromatic compounds. These organometallic compounds and others have been proven to reduce the activity or useful life of hydrotreating catalysts. The presence of such metal contaminants and poly-nuclear aromatics results in reduced process performance, increased capital costs, and/or increased operating costs of refinery processing units. The metals in the residual fraction of the crude oil deposit on the hydroprocessing catalyst, resulting in catalyst deactivation. The poly-nuclear aromatic compounds are coke precursors that form coke at high temperatures, which also causes catalyst deactivation.

There are generally three common reactor types used in the refining industry: fixed-bed, ebullated-bed, and moving-bed. The decision to use a particular type of reactor is based on a number of criteria including the type of feedstock, desired conversion percentage, flexibility, run length and product quality, among others. In a refinery, the down-time for replacement or renewal of catalyst must be as short as possible. Further, the economics of the process will generally depend upon the versatility of the system to handle feed streams containing varying amounts of contaminants such as sulfur, nitrogen, metals, and/or organometallic compounds, such as those found in vacuum gas oil, deasphalted oil, and residues.

In a fixed-bed reactor, catalyst particles are stationary and do not move with respect to a fixed reference frame. Fixed-bed technologies are not preferred in treating particularly heavy charges containing relatively high quantity of heteroatoms, metals, and asphaltenes, because these contaminants cause the rapid deactivation of the catalyst and plugging of the reactor. In conventional fixed-bed reactors, the hydroprocessing catalysts are replaced regularly in order to maintain the desired level of catalyst activity and throughput. Multiple fixed-bed reactors connected in series can be used to achieve a relatively high conversion of heavy feedstocks boiling above a cut point in the range 300° C. to 400° C., but such designs require high capital investment and may be commercially impractical for certain feedstocks. For example, catalysts may need to be replaced every 3 to 4 months.

Ebullated-bed reactors were developed to overcome plugging problems commonly associated with fixed-bed reactors during processing of relatively heavy feedstocks and as the conversion requirements increase, e.g., for vacuum residuum. In general, an ebullated-bed reactor includes concurrently flowing streams of liquids or slurries of liquids, solids and gas, through a vertically-oriented cylindrical vessel containing catalyst. The catalyst is placed in motion in the liquid and has a gross volume dispersed through the liquid medium that is greater than the volume of the mass when stationary. In an ebullated-bed reactor, the catalyst is in an expanded bed, thereby countering plugging problems associated with fixed-bed reactors. The fluidized nature of the catalyst in an ebullated-bed reactor also allows for on-line catalyst replacement of a small portion of catalyst in the bed. This results in a high net bed activity which does not vary with time.

Because catalyst is added and withdrawn from the unit daily, ebullated-bed reactors consume a large amount of catalysts. The catalyst addition rate is a function of feedstock quality, targeted objectives, conversion level and the unit design. A typical catalyst addition rate in an ebullated-bed reactor is 0.1 kg/BPSD (barrels per stream day). For a 100,000 BPSD unit, the daily fresh catalyst consumption is 10 metric tons per day, resulting in about 20 metric tons of spent catalyst daily. The increased weight is due to coke and metals deposited in the catalyst pores. Assuming $10/kg catalyst prices, the total catalyst cost for a 100,000 BPSD unit is about $100,000 US per day, which is a significant operating cost. If a catalyst is recycled once to the unit after a 90% recovery, however, the catalyst cost will be lowered by 45%.

Moving-bed reactors combine certain advantages of fixed-bed operations and the relatively easy catalyst replacement of ebullated-bed technology. Operating conditions are generally more severe than those typically used in fixed-bed reactor, i.e., the pressure can exceed 200 kg/cm$^2$, and the temperature can be in the range of from 400° C. to 430° C. During catalyst replacement, catalyst movement is slow compared to the linear velocity of the feed. Catalyst addition and withdrawal are performed, for instance, via a sluice system at the top and bottom of the reactor. The advantage of the moving-bed reactor is that the top layer of the moving-bed consists of fresh catalyst. Contaminants deposited on the top of the bed move downward with the catalyst and are released from the bottom of the reactor during catalyst withdrawal. The tolerance for metals and other contaminants is, therefore, much greater than in a fixed-bed reactor. With this capability, the moving-bed reactor has advantages for hydroprocessing of very heavy feeds, especially when several reactors are combined in series.

SUMMARY

There is a continual need for methods to process the spent catalysts to recover catalytic activity for reuse in catalytic hydroprocessing. It has been discovered that a method for regenerating and rejuvenating a spent catalyst that includes a partial combustion of the spent catalyst to remove a portion of the coke before acid treatment to remove metal contaminants may greatly enhance the efficiency of catalyst regeneration and rejuvenation.

According to one embodiment, a method for regenerating and rejuvenating a spent catalyst comprising coke and contaminant metals includes washing the spent catalyst with a solvent; drying, at least partially, the spent catalyst; partially combusting the spent catalyst to remove a portion of the coke, thereby producing a partially de-coked catalyst; acid washing the partially de-coked catalyst; and fully combusting the partially de-coked catalyst, thereby producing a regenerated and rejuvenated catalyst. The portion of the coke removed during the partial combustion is greater than or equal to 10 wt. % and less than or equal to 60 wt. %. No rare earth elements are added to the partially de-coked catalyst prior to the fully combusting the partially de-coked catalyst.

Additional features and advantages of the embodiments described herein will be set forth in the detailed description which follows, and in part will be readily apparent to those skilled in the art from that description or recognized by practicing the embodiments described, including the detailed description and the claims which are provided infra.

DETAILED DESCRIPTION

In embodiments, a method for regenerating and rejuvenating a spent catalyst comprising coke and contaminant metals includes washing the spent catalyst with a solvent, at least partially drying the spent catalyst, partially combusting the spent catalyst to remove a portion of the coke, thereby producing a partially de-coked catalyst, acid washing the partially de-coked catalyst to remove contaminant metals, and fully combusting the partially de-coked catalyst, thereby producing a regenerated and rejuvenated catalyst. The portion of the coke removed to produce the partially de-coked catalyst is greater than or equal to 10 wt. % and less than or equal to 95 wt. %. No rare earth elements are added to the partially de-coked catalyst prior to the fully combusting the partially de-coked catalyst. Embodiments of the method will now be described in further detail.

The spent catalyst, such as catalyst recovered from a crude oil processing unit, is washed with a solvent to remove residual oil from the spent catalyst. In embodiments, the solvent has a Hildebrandt solubility factor of greater than or equal to 18. For example, solvents with a Hildebrandt solubility factor of greater than or equal to 18 include, but are not limited to, benzene, toluene, xylenes, pyridine, tetrahydrofuran, 2-ethoxyethanol, morpholine, dimethylformamide, n-propyl alcohol, ethyl alcohol, dimethyl sulfoxide, n-butyl alcohol, methyl alcohol, propylene glycol, ethylene glycol, glycerol, acetone, and water. It is to be understood that a mixture of two or more of these exemplary solvents may also have a Hildebrandt solubility factor of greater than or equal to 18. In embodiments, the solvent may be selected from toluene, benzene, xylenes, acetone, dichloromethane, methanol, ethanol, an alcohol comprising greater than or equal to three carbon atoms, an aromatic stream recovered from a refining process, and a combination of two or more thereof. Exemplary aromatic streams include a mid-heavy naphtha fraction boiling in the range from 80° C. to 180° C. and an aromatic bottom fraction from an aromatic recovery complex.

In embodiments, the spent catalyst may be dried, at least partially, after the solvent wash and prior to further processing to remove residual solvent from the solvent wash. This drying may be performed by flowing a gas over the catalyst. The gas is not particularly limited and may include air, nitrogen, oxygen, a noble gas, and a combination of two or more of these. As used herein, at least partially drying the spent catalyst refers to removing at least 50 wt. % of the residual solvent from the solvent washed, spent catalyst. In embodiments, greater than or equal to 50 wt. % and less than or equal to 100 wt. % residual solvent is removed. In embodiments, greater than or equal to 55 wt. % and less than or equal to 95 wt. % residual solvent is removed. In embodiments, greater than or equal to 60 wt. % and less than or equal to 90 wt. % residual solvent is removed. In embodiments, greater than or equal to 65 wt. % and less than or equal to 85 wt. % residual solvent is removed. In embodiments, greater than or equal to 70 wt. % and less than or equal to 80 wt. % residual solvent is removed. It should be understood that the residual solvent removed may be within a range formed from any one of the lower bounds for the residual solvent removed and any one of the upper bounds for the residual solvent removed described herein.

In embodiments, prior to acid washing, which leaches metals from the spent catalyst, the spent catalyst is subjected to combustion to partially remove the coke deposits on the spent catalysts. This initial combustion is referred to as "partial combustion" herein. Without intending to be bound by theory, acid washing is believed to remove contaminant metals, such as nickel and vanadium, from the spent catalyst. However, coke present on the spent catalyst could have two effects on the acid washing. First, the coke may actually protect the catalyst pore structure from acid damage during the acid washing. Second, the coke may cover the active phase metals and prevent them from leaching during the acid washing. Therefore, in embodiments described herein, the spent catalyst may be subjected to partial combustion, such that the coke is partially removed, and then this partially de-coked catalyst may be subjected to an acid wash. Without being bound by any particular theory, partially de-coking the catalyst may allow for sufficient coke to protect the core structure of the catalyst, while not having so much coke present as to prevent leaching of the metal contaminants.

In embodiments, the partial combustion may include applying a combusting agent to the spent catalyst. The combusting agent may be, for instance, air, oxygen, ozone, oxides of nitrogen, and a combination of two or more thereof. In embodiments, the combusting agent may be air.

The combusting agent may comprise greater than or equal to the stoichiometric amount of coke present on the catalyst, with two moles of oxygen (from the combusting agent) per mole of carbon (from the coke). For partial combustion, the amount of combusting agent may be limited to achieve only partial combustion. For instance, if 60% combustion is desired, the combusting agent can be added in an amount that is 120% of the molar concentration of the coke present, based on the oxygen content of the combusting agent. For a further example, if 30% combustion is desired, the combusting agent can be added in an amount that is 60% of the molar concentration of the coke present, based on the oxygen content of the combusting agent.

In embodiments, the partial combustion is accomplished by heating the combined spent catalyst and combusting agent in a chamber at an elevated temperature for an amount of time. In embodiments, the chamber may have a temperature of greater than or equal to 400° C. and less than or equal to 500° C., greater than or equal to 405° C. and less than or equal to 495° C., greater than or equal to 410° C. and less than or equal to 490° C., greater than or equal to 415° C. and less than or equal to 485° C., greater than or equal to 420° C. and less than or equal to 480° C., greater than or equal to 425° C. and less than or equal to 475° C., greater than or equal to 430° C. and less than or equal to 470° C., greater than or equal to 435° C. and less than or equal to 465° C., greater than or equal to 440° C. and less than or equal to 460° C., or even greater than or equal to 445° C. and less than or equal to 455° C. It should be understood that the temperature may be within a range formed from any one of the lower bounds for the temperature and any one of the upper bounds for the temperature described herein.

In embodiments, the amount of time may be greater than or equal to 15 minutes and less than or equal to 150 minutes, greater than or equal to 20 minutes and less than or equal to 145 minutes, greater than or equal to 25 minutes and less than or equal to 140 minutes, greater than or equal to 30 minutes and less than or equal to 135 minutes, greater than or equal to 35 minutes and less than or equal to 130 minutes, greater than or equal to 40 minutes and less than or equal to 125 minutes, greater than or equal to 45 minutes and less than or equal to 120 minutes, greater than or equal to 50 minutes and less than or equal to 115 minutes, greater than or equal to 55 minutes and less than or equal to 110 minutes, greater than or equal to 55 minutes and less than or equal to 105 minutes, greater than or equal to 60 minutes and less than or equal to 100 minutes, greater than or equal to 65 minutes and less than or equal to 90 minutes, greater than or equal to 70 minutes and less than or equal to 85 minutes, or even greater than or equal to 75 minutes and less than or equal to 80 minutes. It should be understood that the time may be within a range formed from any one of the lower bounds for the time and any one of the upper bounds for the time described herein.

It should be understood that the partial combustion may take place in a chamber at any temperature range described herein for any amount of time described herein. For instance, the partial combustion may be accomplished by subjecting the spent catalyst to a chamber having a temperature of greater than or equal to 400° C. and less than or equal to 500° C. for a time period of greater than or equal to 15 minutes and less than or equal to 150 minutes or for greater than or equal to 20 minutes and less than or equal to 145 minutes.

In further embodiments, the chamber may have a temperature of greater than or equal to 500° C. and less than or equal to 575° C. However, at such higher temperatures, the amount of time may be adequately shortened to ensure partial oxidation. For instance, when the temperature is greater than or equal to 500° C. and less than or equal to 575° C., the amount of time may be greater than or equal to 2 minutes and less than or equal to 10 minutes, greater than or equal to 3 minutes and less than or equal to 9 minutes, greater than or equal to 4 minutes and less than or equal to 8 minutes, or even greater than or equal to 5 minutes and less than or equal to 7 minutes.

In embodiments, the portion of coke removed during the partial combustion is greater than or equal to 10 wt. % and less than or equal to 60 wt. %. For instance, the portion of coke removed during the partial combustion may be greater than or equal to 15 wt. % and less than or equal to 55 wt. %, greater than or equal to 20 wt. % and less than or equal to 50 wt. %, greater than or equal to 25 wt. % and less than or equal to 45 wt. %, or even greater than or equal to 30 wt. % and less than or equal to 40 wt. %. It should be understood that the portion of coke removed during the partial combustion may be within a range formed from any one of the lower bounds for the portion and any one of the upper bounds for the portion described herein.

In embodiments, the acid washing may include contacting the partially de-coked catalyst with a solution having a pH greater than or equal to 1 and less than or equal to 3. For instance, the solution having a pH greater than or equal to 1 and less than or equal to 3 may include an aqueous solution of sulfuric acid, nitric acid, phosphoric or phosphorous acid, hydrohalogenic acid, a sulfonic acid, oxalic acid, acetic acid, citric acid, or a combination of two or more thereof. Exemplary hydrohalogenic acids include hydrochloric acid and perchloric acid. Exemplary combinations of acid include aqua regia, which is a mixture of nitric acid and hydrochloric acid.

In embodiments, the catalyst to acid weight ratio may be greater than or equal to 1:20 and less than or equal to 20:1. For example, the catalyst to acid weight ratio may be greater than or equal to 1:19 and less than or equal to 19:1, greater than or equal to 1:18 and less than or equal to 18:1, greater than or equal to 1:17 and less than or equal to 17:1, greater than or equal to 1:16 and less than or equal to 16:1, greater than or equal to 1:15 and less than or equal to 15:1, greater than or equal to 1:14 and less than or equal to 14:1, greater than or equal to 1:13 and less than or equal to 13:1, greater than or equal to 1:12 and less than or equal to 12:1, greater than or equal to 1:11 and less than or equal to 11:1, greater than or equal to 1:10 and less than or equal to 10:1, greater than or equal to 1:9 and less than or equal to 9:1, greater than or equal to 1:8 and less than or equal to 8:1, greater than or equal to 1:7 and less than or equal to 7:1, greater than or equal to 1:6 and less than or equal to 6:1, greater than or equal to 1:5 and less than or equal to 5:1, greater than or equal to 1:4 and less than or equal to 4:1, greater than or equal to 1:3 and less than or equal to 3:1, greater than or equal to 1:2 and less than or equal to 2:1, or even about 1:1. It should be understood that the catalyst to acid weight ratio may be within a range formed from any one of the lower bounds for the catalyst to acid weight ratio and any one of the upper bounds for the catalyst to acid weight ratio described herein.

In embodiments, the acid washing may include acid washing the partially de-coked catalyst at temperature for an amount of time. For example, the partially de-coked catalyst may be acid washed at a temperature greater than or equal to 20° C. and less than or equal to 80° C., greater than or equal to 25° C. and less than or equal to 75° C., greater than or equal to 30° C. and less than or equal to 70° C., greater than or equal to 35° C. and less than or equal to 65° C., greater than or equal to 40° C. and less than or equal to 60° C., or greater than or equal to 45° C. and less than or equal to 55° C. It should be understood that the temperature may be within a range formed from any one of the lower bounds for the temperature and any one of the upper bounds for the temperature described herein. The acid washing may take place for a time period greater than or equal to 10 minutes and less than or equal to 90 minutes, greater than or equal to 15 minutes and less than or equal to 85 minutes, greater than or equal to 20 minutes and less than or equal to 80 minutes, greater than or equal to 25 minutes and less than or equal to 75 minutes, greater than or equal to 30 minutes and less than or equal to 70 minutes, greater than or equal to 35 minutes and less than or equal to 65 minutes, greater than or equal to 40 minutes and less than or equal to 60 minutes, or greater than or equal to 45 minutes and less than or equal to 55 minutes. It should be understood that the time period may be within a range formed from any one of the lower bounds for the time period and any one of the upper bounds for the time period described herein. It should further be understood that the acid washing may take place at any temperature range described herein for any amount of time described herein.

It should be understood that the acid washing may take place in a chamber at any temperature range described herein for any amount of time described herein. For instance, the partially de-coked catalyst may be acid washed at a temperature of greater than or equal to 20° C. and less than or equal to 80° C. for a time period of greater than or equal to 10 minutes and less than or equal to 90 minutes. In embodiments, the partially de-coked catalyst may be acid washed at a temperature of greater than or equal to 25° C. and less than or equal to 75° C. for a time period of greater than or equal to 15 minutes and less than or equal to 85 minutes. In embodiments, the partially de-coked catalyst may be acid washed at a temperature of greater than or equal to 30° C. and less than or equal to 70° C. for a time period of greater than or equal to 20 minutes and less than or equal to 80 minutes. In embodiments, the partially de-coked catalyst may be acid washed at a temperature of greater than or equal to 35° C. and less than or equal to 65° C. for a time period of greater than or equal to 25 minutes and less than or equal to 75 minutes. In embodiments, the partially de-coked catalyst may be acid washed at a temperature of greater than or equal to 40° C. and less than or equal to 60° C. for a time period of greater than or equal to 30 minutes and less than or equal to 70 minutes. In embodiments, the partially de-coked catalyst may be acid washed at a temperature of greater than or equal to 45° C. and less than or equal to 55° C. for a time period of greater than or equal to 35 minutes and less than or equal to 65 minutes.

In embodiments, the acid washing may be followed by water washing the partially de-coked catalyst to remove any residual acid left on the catalyst after the acid washing. To ensure removal of the residual acid, the pH of the wash water may be measured after the wash water is allowed to pass through the catalyst. The water washing may be considered complete when the wash water after being contacted with the partially de-coked catalyst has a pH greater than or equal to 6.5 and less than or equal to 7.5. In embodiments, the pH may be greater than or equal to 6.6 and less than or equal to 7.4, greater than or equal to 6.7 and less than or equal to 7.3, greater than or equal to 6.8 and less than or equal to 7.2, greater than or equal to 6.9 and less than or equal to 7.1, or about 7. It should be understood that the pH may be within a range formed from any one of the lower bounds for the pH and any one of the upper bounds for the pH described herein.

In embodiments, the partially de-coked catalyst may be dried. In embodiments, the drying may be performed after acid and water washings but prior to full combustion, such that water may be the primary substance removed during the drying. In embodiments, the drying may be accomplished by subjecting the partially de-coked catalyst to an environment having a temperature greater than or equal to 20° C. and less than or equal to 200° C., greater than or equal to 25° C. and less than or equal to 195° C., greater than or equal to 30° C. and less than or equal to 190° C., greater than or equal to 35° C. and less than or equal to 185° C., greater than or equal to 40° C. and less than or equal to 180° C., greater than or equal to 45° C. and less than or equal to 175° C., greater than or equal to 50° C. and less than or equal to 170° C., greater than or equal to 55° C. and less than or equal to 165° C., greater than or equal to 60° C. and less than or equal to 160° C., greater than or equal to 65° C. and less than or equal to 155° C., greater than or equal to 70° C. and less than or equal to 150° C., greater than or equal to 75° C. and less than or equal to 145° C., greater than or equal to 80° C. and less than or equal to 140° C., greater than or equal to 85° C. and less than or equal to 135° C., greater than or equal to 90° C. and less than or equal to 130° C., greater than or equal to 95° C. and less than or equal to 125° C., greater than or equal to 100° C. and less than or equal to 120° C., or even greater than or equal to 105° C. and less than or equal to 115° C. It should be understood that the temperature may be within a range formed from any one of the lower bounds for the temperature and any one of the upper bounds for the temperature described herein.

In embodiments, the time used for drying the catalysts may be determined by monitoring certain characteristics of the catalysts as they are being dried. For instance, drying may be conducted until no detectable moisture is evolved from the partially de-coked catalyst during the drying. In embodiments, the weight of the catalyst may be used to determine when no further moisture is being removed from the catalyst during drying. A first weight measurement may be obtained, followed by drying, and then a second weight measurement may be obtained. The drying may be conducted until the second weight changes by no more than 1% from the first weight.

After the acid washing, and the optional water washing and drying, when applicable, the partially de-coked catalyst may be subjected to further combustion such that substantially all the coke is removed, herein referred to as "full combustion." As used herein, the term "substantially all" means a total of greater than or equal to 96%, greater than or equal to 97%, greater than or equal to 98%%, greater than or equal to 99%, or even greater than or equal to 99.9%, of the coke deposited on the spent catalyst is removed during the partial combustion and the full combustion.

The full combustion may be accomplished using the same or different conditions as the partial combustion described above. In embodiments, the full combustion may include applying a combusting agent to the partially de-coked catalyst. The combusting agent may be, for instance, air, oxygen, ozone, oxides of nitrogen, and a combination of two or more thereof. In embodiments, the combusting agent may be air.

The combusting agent may comprise greater than or equal to the stoichiometric amount of coke present on the catalyst, with two moles of oxygen (from the combusting agent) per mole of carbon (from the coke). For full combustion, the amount of combusting agent may be applied in a molar concentration that is at least twice the molar concentration of the coke remaining on the catalyst, based on the oxygen content of the combusting agent. In embodiments, the combusting agent may be applied at 20 wt. % greater than the required stoichiometric amount.

In embodiments, the full combustion is accomplished by heating the combined partially de-coked catalyst and combusting agent in a chamber at an elevated temperature for an amount of time. In embodiments, the chamber may have a temperature of greater than or equal to 500° C. and less than or equal to 575° C., greater than or equal to 505° C. and less than or equal to 570° C., greater than or equal to 510° C. and less than or equal to 565° C., greater than or equal to 515° C. and less than or equal to 560° C., greater than or equal to 520° C. and less than or equal to 555° C., greater than or equal to 525° C. and less than or equal to 550° C., greater than or equal to 530° C. and less than or equal to 545° C., or even greater than or equal to 535° C. and less than or equal to 540° C. It should be understood that the temperature may be within a range formed from any one of the lower bounds for the temperature and any one of the upper bounds for the temperature described herein.

In embodiments, the amount of time may be greater than or equal to 15 minutes and less than or equal to 150 minutes, greater than or equal to 20 minutes and less than or equal to 145 minutes, greater than or equal to 25 minutes and less than or equal to 140 minutes, greater than or equal to 30 minutes and less than or equal to 135 minutes, greater than or equal to 35 minutes and less than or equal to 130 minutes, greater than or equal to 40 minutes and less than or equal to 125 minutes, greater than or equal to 45 minutes and less than or equal to 120 minutes, greater than or equal to 50 minutes and less than or equal to 115 minutes, greater than or equal to 55 minutes and less than or equal to 110 minutes, greater than or equal to 60 minutes and less than or equal to 105 minutes, greater than or equal to 65 minutes and less than or equal to 100 minutes, greater than or equal to 70 minutes and less than or equal to 95 minutes, greater than or equal to 75 minutes and less than or equal to 90 minutes, or even greater than or equal to 80 minutes and less than or equal to 85 minutes. It should be understood that the time may be within a range formed from any one of the lower bounds for the time and any one of the upper bounds for the time described herein.

It should be understood that the partial combustion may take place in a chamber at any temperature range described herein for any amount of time described herein. For instance, the partial combustion may be accomplished by subjecting the spent catalyst to a chamber having a temperature of greater than or equal to 500° C. and less than or equal to 575° C. for a time period of greater than or equal to 15 minutes and less than or equal to 150 minutes or for greater than or equal to 20 minutes and less than or equal to 145 minutes.

In embodiments, no rare earth elements are added to the partially de-coked catalyst prior to fully combusting the partially de-coked catalyst. As used herein, the "rare earth elements" include the fifteen lanthanides plus scandium and yttrium. Thus, the rare earth elements may include one or more of scandium, yttrium, lanthanum, cerium, praseodymium, neodymium, promethium, samarium, europium, gadolinium, terbium, dysprosium, holmium, erbium, thulium, ytterbium, and lutetium.

According to an aspect, either alone or in combination with any other aspect, a method for regenerating and rejuvenating a spent catalyst comprising coke and contaminant metals includes washing the spent catalyst with a solvent; drying, at least partially, the spent catalyst; partially combusting the spent catalyst to remove a portion of the coke, thereby producing a partially de-coked catalyst; acid washing the partially de-coked catalyst; and fully combusting the partially de-coked catalyst, thereby producing a regenerated and rejuvenated catalyst. The portion of the coke removed during the partial combustion is greater than or equal to 10 wt. % and less than or equal to 60 wt. %. No rare earth elements are added to the partially de-coked catalyst prior to the fully combusting the partially de-coked catalyst.

According to a second aspect, either alone or in combination with any other aspect, the solvent has a Hildebrandt solubility factor of greater than or equal to 18.

According to a third aspect, either alone or in combination with any other aspect, the solvent is selected from the group consisting of toluene, benzene, xylenes, acetone, dichloromethane, methanol, ethanol, an alcohol comprising greater than or equal to three carbon atoms, an aromatic stream recovered from a refining process, and a combination of two or more thereof.

According to a fourth aspect, either alone or in combination with any other aspect, the drying is performed by flowing a gas over the catalyst.

According to a fifth aspect, either alone or in combination with any other aspect, the gas is selected from the group consisting of air, nitrogen, oxygen, a noble gas, and a combination of two or more thereof.

According to a sixth aspect, either alone or in combination with any other aspect, the portion of the coke removed during the partially combusting the spent catalyst is greater than or equal to 20 wt. % and less than or equal to 60 wt. %.

According to a seventh aspect, either alone or in combination with any other aspect, the portion of the coke removed during the partially combusting the spent catalyst is greater than or equal to 20 wt. % and less than or equal to 50 wt. %.

According to an eighth aspect, either alone or in combination with any other aspect, the partially combusting the spent catalyst comprises applying a combusting agent to the spent catalyst.

According to a ninth aspect, either alone or in combination with any other aspect, the combusting agent is selected from the group consisting of air, oxygen, ozone, oxides of nitrogen, and a combination of two or more thereof.

According to a tenth aspect, either alone or in combination with any other aspect, the partially combusting the spent catalyst comprises subjecting the spent catalyst to a chamber having a temperature of greater than or equal to 400° C. and less than or equal to 500° C. for a time period of greater than or equal to 15 minutes and less than or equal to 150 minutes.

According to an eleventh aspect, either alone or in combination with any other aspect, the acid washing comprises contacting the partially de-coked catalyst with a solution having a pH greater than or equal to 1 and less than or equal to 3.

According to a twelfth aspect, either alone or in combination with any other aspect, the solution comprises an acid selected from the group consisting of sulfuric acid, hydrochloric acid, perchloric acid, nitric acid, acetic acid, citric acid, oxalic acid, and a combination of two or more thereof.

According to a thirteenth aspect, either alone or in combination with any other aspect, the acid washing comprises acid washing the partially de-coked catalyst at a temperature greater than or equal to 20° C. and less than or equal to 80° C. for a time period of greater than or equal to 10 minutes and less than or equal to 90 minutes.

According to a fourteenth aspect, either alone or in combination with any other aspect, the acid washing is followed by water washing the partially de-coked catalyst by contacting the partially de-coked catalyst with wash water.

According to a fifteenth aspect, either alone or in combination with any other aspect, the method further comprises determining a pH of the wash water after the partially de-coked catalyst is contacted with the wash water and continuing the water washing until the pH of the wash water is greater than or equal to 6.5 and less than or equal to 7.5.

According to a sixteenth aspect, either alone or in combination with any other aspect, further comprises drying the partially de-coked catalyst after the water washing and prior to the fully combusting the partially de-coked catalyst.

According to a seventeenth aspect, either alone or in combination with any other aspect, the drying comprises subjecting the partially de-coked catalyst to an environment having a temperature greater than or equal to 20° C. and less than or equal to 200° C.

According to an eighteenth aspect, either alone or in combination with any other aspect, the drying is conducted until no detectable moisture is evolved from the partially de-coked catalyst.

According to a nineteenth aspect, either alone or in combination with any other aspect, wherein the fully combusting the partially de-coked catalyst comprises subjecting the spent catalyst to a chamber having a temperature of greater than or equal to 500° C. and less than or equal to 575° C. for a time period of greater than or equal to 15 minutes and less than or equal to 150 minutes.

According to a twentieth aspect, either alone or in combination with any other aspect, the partially combusting the spent catalyst comprises applying air to the spent catalyst and the fully combusting the partially de-coked catalyst comprises applying air to the partially de-coked catalyst.

Example

Using embodiments described above, an exemplary catalyst regeneration and rejuvenation process was initiated and operated.

A spent catalyst from a hydrocracking reactor was analyzed using conventional methods. Specifically, the concentrations of carbon, sulfur, nickel, vanadium, arsenic, iron, and sodium in the spent catalyst were determined by conventional methods. Loss on ignition at 550° C. was determined in accordance with ASTM UOP275-98. Surface area was determined by conventional methods. Pore volume was determined in accordance with ASTM D3663. Bulk crush strength was determined in accordance with ASTM D4179.

Select components and property data for the spent catalyst are provided in Table 1.

TABLE 1

Components and Properties of Spent Hydrocracking catalysts

| Composition | Value |
| --- | --- |
| Carbon | 16.2 wt. % |
| Sulfur | 2.9 wt. % |
| Nickel | 0.77 wt. % |
| Vanadium | 1,200 ppm by weight |
| Arsenic | 19 ppm by weight |
| Iron | 392 ppm by weight |
| Sodium | 825 ppm by weight |

| Property | Value |
| --- | --- |
| LOI @550° C.[1] | 23.1 wt. % |
| Surface area | 128 m$^2$/g |
| Pore volume | 0.269 cm$^3$/g |
| Bulk crush strength | 11.71 MPa |

[1]LOI @550° C. = loss on ignition at 550° C.

The spent catalyst was then regenerated using the following process steps.

Solvent wash: The catalyst was subjected to soxhlet extraction with toluene as a solvent to remove residual oil. The soxhlet extractor was charged with 100 grams of spent catalyst and the toluene was recycled through the spent catalyst until pure toluene was found in the extractor. For this example, the soxhlet extraction was performed for 2 hours. The solvent wash of the spent catalyst produced 17.7 wt. % recovered oil.

Drying: The catalyst was dried in an oven at 100° C. for 1 hour, thereby removing significantly all the residual solvent.

Partial combustion: The soxhlet extracted sample was partially combusted in air in an oven having a temperature of 450° C. for 23 minutes to remove 30 wt. % of the coke on the catalyst surface and pores.

Acid wash: The partially combusted catalyst sample was subjected to acid washing with 15 wt. % sulfuric acid at a catalyst to acid ratio of 1:5 for 30 minutes at 80° C. In the acid wash, 90 wt/% nickel and 70 wt. % of vanadium were removed from the catalysts, as determined by measuring the concentration of the metal in solution using atomic absorption spectroscopy.

Water wash: The partially de-coked catalyst was washed with fresh water.

Drying: The partially de-coked catalyst was dried for 2 hours at 200° C. to remove greater than 99 wt. % of the residual water present.

Full combustion: The regenerated catalyst obtained as described above was then subjected to full combustion at 359° C. for 27 minutes. For this example, combustion was considered complete when at least 97 wt. % of the coke was removed. Analysis of the regenerated and rejuvenated catalyst found 0.45 wt. % coke remaining after full combustion using ASTM D5373.

Table 2 provides selected final composition and property data for the regenerated and rejuvenated catalyst after the treatment described above.

TABLE 2

Components and Properties of Regenerated and Rejuvenated Hydrocracking catalysts

| Composition | Value |
| --- | --- |
| Carbon | 0.45 wt. % |
| Sulfur | 0.1 wt. % |
| Nickel | 1.1 wt. % |
| Vanadium | 360 ppm by weight |
| Arsenic | <10 ppm by weight |
| Iron | <100 ppm by weight |
| Sodium | <100 ppm by weight |

| Property | Value |
| --- | --- |
| LOI @550° C.[1] | 4.2 wt. % |
| Surface area | 216 m$^2$/g |
| Pore volume | 0.478 cm$^3$/g |
| Bulk crush strength | 11.73 MPa |

[1]LOI @550° C. = loss on ignition at 550° C.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method for regenerating and rejuvenating a spent catalyst comprising coke and contaminant metals, the method comprising
   washing the spent catalyst with a solvent to produce a washed, spent catalyst;
   drying, at least partially, the washed, spent catalyst to product a dried, spent catalyst;
   partially combusting the dried, spent catalyst to remove a portion of the coke, thereby producing a partially de-coked catalyst;
   acid washing the partially de-coked catalyst to produce an acid-washed, partially-decoked catalyst; and
   fully combusting the acid-washed, partially de-coked catalyst, thereby producing a regenerated and rejuvenated catalyst;
   wherein the portion of the coke removed during the partially combusting is greater than or equal to 10 wt. % and less than or equal to 60 wt. %; and no rare earth elements are added to the partially de-coked catalyst prior to the fully combusting the partially de-coked catalyst.

2. The method of claim 1, wherein the solvent has a Hildebrandt solubility factor of greater than or equal to 18.

3. The method of claim 1, wherein the solvent is selected from the group consisting of toluene, benzene, xylenes, acetone, dichloromethane, methanol, ethanol, an alcohol comprising greater than or equal to three carbon atoms, an aromatic stream recovered from a refining process, and a combination of two or more thereof.

4. The method of claim 1, wherein the drying is performed by flowing a gas over the washed, spent catalyst.

5. The method of claim 4, wherein the gas is selected from the group consisting of air, nitrogen, oxygen, a noble gas, and a combination of two or more thereof.

6. The method of claim 1, wherein the portion of the coke removed during the partially combusting the dried, spent catalyst is greater than or equal to 20 wt. % and less than or equal to 60 wt.

7. The method of claim 1, wherein the portion of the coke removed during the partially combusting the dried, spent catalyst is greater than or equal to 20 wt. % and less than or equal to 50 wt.

8. The method of claim 1, wherein the partially combusting the dried, spent catalyst comprises applying a combusting agent to the spent catalyst.

9. The method of claim 8, wherein the combusting agent is selected from the group consisting of air, oxygen, ozone, oxides of nitrogen, and a combination of two or more thereof.

10. The method of claim 1, wherein the partially combusting the dried, spent catalyst comprises subjecting the dried, spent catalyst to a chamber having a temperature of greater than or equal to 400° C. and less than or equal to 500° C. for a time period of greater than or equal to 15 minutes and less than or equal to 150 minutes.

11. The method of claim 1, wherein the acid washing comprises contacting the partially de-coked catalyst with a solution having a pH greater than or equal to 1 and less than or equal to 3.

12. The method of claim 11, wherein the solution comprises an acid selected from the group consisting of sulfuric acid, hydrochloric acid, perchloric acid, nitric acid, acetic acid, citric acid, oxalic acid, and a combination of two or more thereof.

13. The method of claim 1, wherein the acid washing comprises acid washing the partially de-coked catalyst at a temperature greater than or equal to 20° C. and less than or equal to 80° C. for a time period of greater than or equal to 10 minutes and less than or equal to 90 minutes.

14. The method of claim 1, wherein the acid washing is followed by water washing the partially de-coked catalyst by contacting the partially de-coked catalyst with wash water.

15. The method of claim 14, further comprising determining a pH of the wash water after the partially de-coked catalyst is contacted with the wash water and continuing the water washing until the pH of the wash water is greater than or equal to 6.5 and less than or equal to 7.5.

16. The method of claim 15, further comprising drying the partially de-coked catalyst after the water washing and prior to the fully combusting the partially de-coked catalyst.

17. The method of claim 16, wherein the drying comprises subjecting the partially de-coked catalyst to an environment having a temperature greater than or equal to 20° C. and less than or equal to 200° C.

18. The method of claim 17, wherein the drying is conducted until no detectable moisture is evolved from the partially de-coked catalyst.

19. The method of claim 1, wherein the fully combusting the acid-washed, partially de-coked catalyst comprises subjecting the acid-washed, partially de-coked catalyst to a chamber having a temperature of greater than or equal to 500° C. and less than or equal to 575° C. for a time period of greater than or equal to 15 minutes and less than or equal to 150 minutes.

20. The method of claim 1, wherein the partially combusting the dried, spent catalyst comprises applying air to the dried, spent catalyst and the fully combusting the acid-washed, partially de-coked catalyst comprises applying air to the acid-washed, partially de-coked catalyst.

* * * * *